(12) United States Patent
Kristensen et al.

(10) Patent No.: US 12,157,050 B2
(45) Date of Patent: Dec. 3, 2024

(54) SPORTS FIELD MARKING EQUIPMENT

(71) Applicant: TinyMobileRobots ApS, Malling (DK)

(72) Inventors: Jens Peder Kvols Kristensen, Malling (DK); Rudi Hansen, Galten (DK); Christoffer Mose, Marslet (DK); Peter Jensen, Skanderborg (DK); Kristian Korsgaard, Aarhus (DK); Lars Bayer Jorgensen, Horsens (DK)

(73) Assignee: Tiny MobileRobots ApS, Malling (DK)

( * ) Notice: Subject to any disclaimer, the term of this patent is extended or adjusted under 35 U.S.C. 154(b) by 244 days.

(21) Appl. No.: 17/764,502

(22) PCT Filed: Sep. 25, 2020

(86) PCT No.: PCT/EP2020/076856
§ 371 (c)(1),
(2) Date: Mar. 28, 2022

(87) PCT Pub. No.: WO2021/063814
PCT Pub. Date: Apr. 8, 2021

(65) Prior Publication Data
US 2022/0339525 A1 Oct. 27, 2022

(30) Foreign Application Priority Data
Oct. 1, 2019 (DK) .......................... PA 2019 01144

(51) Int. Cl.
*A63C 19/06* (2006.01)
(52) U.S. Cl.
CPC ...... *A63C 19/065* (2013.01); *A63C 2019/067* (2013.01)
(58) Field of Classification Search
CPC ....... B05B 12/12; B05B 13/005; B05B 12/00; G01S 19/14; A63C 19/065; A63C 2019/067
See application file for complete search history.

(56) References Cited

U.S. PATENT DOCUMENTS 6,330,503 B1    12/2001  Sharp et al.
10,359,783 B2 *  7/2019  Williams ............. G01C 21/005
(Continued)

FOREIGN PATENT DOCUMENTS

DK    4013950       11/1991
EP    3176542 A1    6/2017
(Continued)

OTHER PUBLICATIONS

Ting et al., Efficient path planning with limit cycle avoidance for mobile robot navigation, 2013, IEEE, p. 500-506 (Year: 2013).*
(Continued)

*Primary Examiner* — McDieunel Marc
(74) *Attorney, Agent, or Firm* — Morse, Barnes-Brown & Pendleton, P.C.; Sean D. Detweiler, Esq.

(57) ABSTRACT

Sports field marking equipment includes a) a paint applying means adapted for marking a sports field on a surface; b) a position determining device configured for determining the position of the sports field marking equipment; c) a distance sensor configured for detecting a goal and/or corner post and the distance thereto; d) a first processor; and e) a first memory coupled to the first processor. The first memory includes program instructions executable by the first processor for receiving a goal and/or corner post detection signal and the measured distance from the distance sensor to the goal and/or corner post; receiving the position and direction of the sports field marking equipment from the position determining device at the time of receiving the detection signal; computing waypoint coordinates of the goal and/or corner post based on the received data; and storing the computed waypoint coordinates of the goal and/or corner post.

10 Claims, 2 Drawing Sheets

(56) References Cited

U.S. PATENT DOCUMENTS

| | | | | |
|---|---|---|---|---|
| 11,199,853 | B1* | 12/2021 | Afrouzi | B25J 13/006 |
| 2007/0059098 | A1* | 3/2007 | Mayfield | A63C 19/06 |
| | | | | 404/84.5 |
| 2019/0038960 | A1 | 2/2019 | Roberts et al. | |
| 2022/0066456 | A1* | 3/2022 | Ebrahimi Afrouzi | ........................ |
| | | | | G06F 3/04883 |

FOREIGN PATENT DOCUMENTS

| | | |
|---|---|---|
| WO | WO-2004/100044 A1 | 11/2004 |
| WO | WO-2015/158347 A1 | 10/2015 |
| WO | WO-2018/007365 A1 | 1/2018 |
| WO | WO-2021/063814 A1 | 4/2021 |

OTHER PUBLICATIONS

Chilian et al., Stereo camera based navigation of mobile robots on rough terrain, 2009, IEEE, p. 4571-4576 (Year: 2009).*

Murdan et al., Indoor positioning system simulation for a robot using radio frequency identification, 2018, IEEE, p. 986-991 (Year: 2018).*

Chen et al., Micro Robot Hockey Simulator—Game Engine Design, 2007, IEEE, p. 9-16 (Year: 2007).*

Search Report from Danish Application No. PA 2019 01144; Dated: Mar. 16, 2020.

Additional Search Report from Danish Application No. PA 2019 001144; Dated: Oct. 2, 2020.

International Search Report for International Application No. PCT/EP2020/076856 dated Nov. 30, 2020.

* cited by examiner

SPORTS FIELD MARKING EQUIPMENT

RELATED APPLICATIONS

This application is a national stage filing under 37 U.S.C. 371 of International Application No. PCT/EP2020/076856, filed Sep. 25, 2020, which claims priority to Denmark Patent Application No. PA 2019 01144, filed Oct. 1, 2019. The entire teachings of said applications are incorporated herein by reference herein.

TECHNICAL FIELD OF THE INVENTION

The present invention relates to sports field marking equipment.

BACKGROUND OF THE INVENTION

Many types of sports fields have fixed posts. Goal posts are probably the most common type and found in sports like European football, American football, rugby and many others. Corner posts are also common in European football in many European countries.

When marking sports fields, it is important that the marking takes these fixed posts into account. Sports fields are often a little inaccurate, e.g. a rectangle is not perfectly rectangular, or two goals that should be positioned precisely opposite each other might be off with several cm's and often not completely parallel as intended. In marking a sports field, it is important to take the precise position of the posts into account and adjust to the imperfection that is found in the field.

Registering the position of the posts can be cumbersome. One method requires land surveying equipment, but this requires first that a land surveyor be hired to do the registration and that the data is transferred to the marking equipment.

US2019/0038960 discloses a line marking device which is easy to use and suggests including a comparator adapted to compare a detected location to a predetermined pattern. The comparator calculates a location and/or a direction error. The comparator receives a position signal from a GNSS receiver. This signal is compared to a target position, which is included in the predetermined pattern. The difference between the target position and GNSS signal is used to calculate the location and/or direction error. The location and/or direction error is then transmitted to the user via a prompting device. The prompting device provides steering information to the user. The steering information comprises visual information indicating current absolute and relative position, current position in reference to a predetermined geo-located pattern, current speed, current direction, steering instructions, orientation of the device and progress or time to complete a task. In addition, the steering information may be transmitted acoustically, e.g. by emitting one sound, which indicates a user to steer right and a second sound, which indicates a user to steer left. An imaging sensor may be connected to the comparator that thereby can detect preset locations with the signals received from the imaging sensor. The comparator may inform a user via the prompting device that a preset location is detected by the imaging sensor. The predetermined pattern may be provided by the user and may be fitted to a surveyed playing field. The survey of the playing field may be performed with the line marking device by pushing it to reference points like the corners of an existing marking and their locations are stored. The line marking device is positioned at the exact location of the reference point and only the signal from the GNSS receiver is used.

SUMMARY OF THE INVENTION

It is one object of the present invention to provide a solution that solves the above-mentioned problem.

The inventor of the present invention has built a marking equipment that is able to easily collect the positions of the posts. By incorporating a distance sensor and a position sensor in the marking equipment, the marking equipment may be configured to detect the precise positions of the posts in relation to the position of the marking equipment.

One aspect relates to a sports field marking equipment comprising:
  a paint applying means adapted for use in marking a sports field on a surface;
  a position determining device configured for determining the position of the sports field marking equipment;
  a distance sensor configured for detecting a goal and/or corner post and the distance thereto;
  a first processor;
  a first memory coupled to the first processor, wherein the first memory comprises program instructions executable by the first processor for:
  receiving a goal and/or corner post detection signal as well as the measured distance from said distance sensor to said goal and/or corner post;
  receiving the position and direction of the sports field marking equipment from said position determining device at the time of receiving said detection signal;
  computing waypoint coordinates of the goal and/or corner post based on said received data; and
  storing the computed waypoint coordinates of said goal and/or corner post.

DETAILED DESCRIPTION OF THE INVENTION

One aspect relates to a sports field marking equipment comprising:
  a paint applying means adapted for use in marking a sports field on a surface;
  a position determining device configured for determining the position of the sports field marking equipment;
  a distance sensor configured for detecting a goal and/or corner post and the distance thereto;
  a first processor;
  a first memory coupled to the first processor, wherein the first memory comprises program instructions executable by the first processor for:
  receiving a goal and/or corner post detection signal as well as the measured distance from said distance sensor to said goal and/or corner post;
  receiving the position and direction of the sports field marking equipment from said position determining device at the time of receiving said detection signal;

computing waypoint coordinates of the goal and/or corner post based on said received data; and storing the computed waypoint coordinates of said goal and/or corner post.

In one or more embodiments, the distance sensor is a one-dimensional sensor.

In one or more embodiments, the distance sensor is a one-dimensional sensor, and wherein the memory comprises program instructions implementing a graphical user interface for:

a) interactively selecting a target location for initiating a goal and/or corner post detection operation; and b) interactively selecting a specific type of goal or corner post from a list of goal and/or corner posts;

wherein the first memory comprises program instructions executable by the first processor for:

computing waypoint coordinates of the goal and/or corner post based on said selection and received data. This configuration allows the first processor to use the shape of the post for correcting the sports field marking equipment's position relative to the post and/or for better identifying the post. As an example, the first processor may identify the The term "one-dimensional sensor or 1D sensor" is used to indicate a sensor capable of determining the plane on which its radiating emitter lies. Hence, the 1D sensor cannot, by itself, determine the unique point in space on that plane at which its radiating emitter is located.

Figure 1:
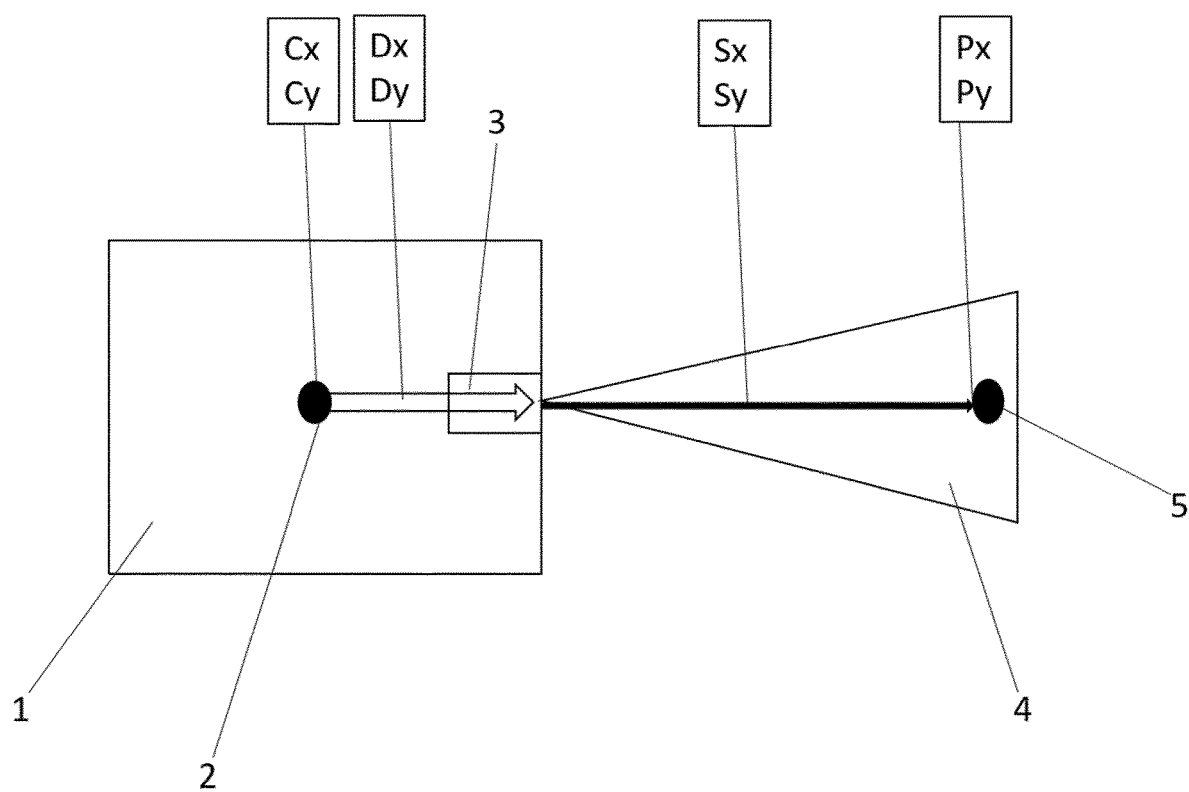
FIG. 1 depicts the operation of a sports field marking equipment where the distance sensor is a one dimensional sensor.

A non-limiting example on how to compute waypoint coordinates may be as follows. If the distance sensor only provides a one-dimensional (1D) distance to the post, the sports field marking equipment needs to be positioned in line with the post as this ensures that the coordinate of the post can be calculated. Referring to FIG. 1, the sports field marking equipment 1 has a core position 2 given by center coordinate C (Cx, Cy). The sports field marking equipment 1 has a given direction, and a fixed distance is present between the core position 2 of the sports field marking equipment 1 to the front of the distance sensor 3. A vector $\vec{D}$, (Dx, Dy), including these two values may be as shown in FIG. 1. The distance measured by the distance sensor 3 to the front of the post 5 may be seen as vector $\vec{S}$ (Sx, Sy) as shown in FIG. 1.

The post coordinate (the front face), P (Px, Py), is thereby calculated as $P=C+\vec{D}+\vec{S}$, or Px=Cx+Dx+Sx, and Py=Cy+Dy+Sy.

In one or more embodiments, the sports field marking equipment further comprises a laser pointer adapted for pointing on a goal and/or corner post, and wherein said laser pointer is configured to point in the same direction as the distance sensor. The laser pointer may be integrated into the distance sensor. Thereby, the user of the sports field marking equipment may easily position it relative to the front face of a goal and/or corner post.

In one or more embodiments, the distance sensor is a two-dimensional sensor.

In one or more embodiments, the distance sensor is a two-dimensional sensor, and wherein the memory comprises program instructions implementing a graphical user interface for interactively selecting a specific type of goal or corner post from a list of goal and/or corner posts;

wherein the first memory comprises program instructions executable by the first processor for:

computing waypoint coordinates of the goal and/or corner post based on said selection and received data. This configuration allows the first processor to use the shape of the post for correcting the sports field marking equipment's position relative to the post and/or for better identifying the post. As an example, the first processor may identify the front of the post, and thereafter instruct the sports field marking equipment to reposition to a position directly in front of the post.

The term two-dimensional sensor or 2D sensor is used to indicate a sensor capable of providing a signal representing a two-dimensional image, in particular of an image wherein an information regarding the position thereof on a two-dimensional plane corresponds to each pixel.

Figure 2:
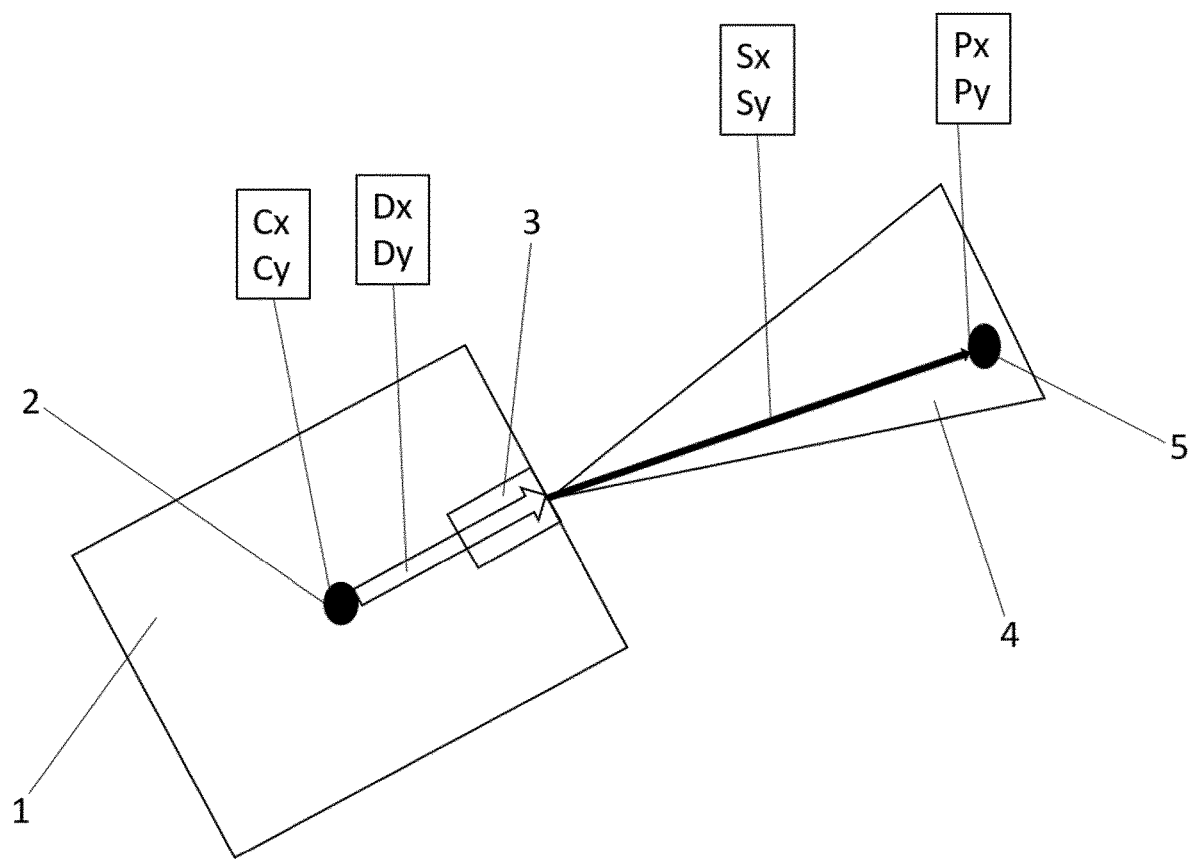
FIG. 2 depicts the operation of sports field marking equipment where the distance sensor is a one dimensional sensor.

A non-limiting example on how to compute waypoint coordinates may be as follows. If sensor provides a two-dimensional (2D) position of the object, the marking equipment just need to be positioned such that the sensor can detect the post. Referring to FIG. 2, the sports field marking equipment 1 has a core position 2 given by center coordinate C (Cx, Cy). The sports field marking equipment 1 has a given direction, and a fixed distance is present between the core position 2 of the sports field marking equipment 1 to the front of the distance sensor 3. A vector $\vec{D}$, (Dx, Dy), including these two values may be as shown in FIG. 2. The distance measured by the distance sensor 3 to the front of the post 5 may be seen as vector $\vec{S}$ (Sx, Sy) as shown in FIG. 2.

The post coordinate (the front face), P (Px, Py), is thereby calculated as $P=C+\vec{D}+\vec{S}$, or Px=Cx+Dx+Sx, and Py=Cy+Dy+Sy.

In one or more embodiments, the memory comprises program instructions implementing a graphical user interface for:

interactively selecting a specific type of sports field from a list of sports fields; wherein the first memory comprises program instructions executable by the processor for:

marking the selected type of sports field based on the computed waypoint(s) of goal and/or corner posts.

In one or more embodiments, the memory comprises program instructions implementing a graphical user interface for:

interactively selecting a specific type of sports field from a list of sports fields; wherein the first memory comprises program instructions executable by the processor for:

automatically marking the selected type of sports field based on the computed waypoint(s) of goal and/or corner posts.

In one or more embodiments, the sports field marking equipment is a mobile robot, and wherein when the waypoint coordinate of a first goal and/or corner post has been computed and stored, the first memory comprises program instructions executable by the processor for:

automatically moving towards and searching for a second or further goal and/or corner post.

In one or more embodiments, the sports field marking equipment is a mobile robot, and wherein when the waypoint coordinate of a first goal and/or corner post has been computed and stored, the first memory comprises program instructions executable by the processor for:

automatically moving towards and searching for a second or further goal and/or corner post based on a) a selected specific type of sports field, b) the position of the sports field marking equipment, c) a selected specific type of goal and/or corner post and/or d) the first computed waypoint coordinate of the first goal and/or corner post.

In one or more embodiments, the sports field marking equipment is a mobile robot, and wherein when the waypoint coordinate of a first goal and/or corner post has been computed and stored, the first memory comprises program instructions executable by the processor for:

automatically moving towards and searching for a second or further goal and/or corner post based on a) a selected specific type of sports field, b) the position of the sports field marking equipment, and c) the first computed waypoint coordinate of the first goal and/or corner post.

In one or more embodiments, the first memory comprises program instructions executable by the processor for:

automatically moving towards and searching for the goal and/or corner post nearest to the last identified goal and/or corner post.

The sports field marking equipment, in the form as a mobile robot, may be adapted to move along a series of waypoints, either in a given order or randomly. A waypoint comprises two- or three-dimensional position information and, optionally, two- or three-dimensional orientation information. The mobile robot may be wheeled or tracked.

In one or more embodiments, the sports field marking equipment comprises a hand-held operator control unit comprising a display means; wherein the sports field marking equipment is configured to provide display signals for displaying stored waypoints and optionally the current position of the sports field marking equipment relative thereto, and wherein the display means of the hand-held operator control unit is configured to display said stored waypoints in response to said display signals. This configuration aids to the process of collecting waypoints, as the user can see the position of the sports field marking equipment and the position of previously collected waypoints. When driving to a new target location, the distance to the previous waypoint can be seen allowing the user to choose a waypoint on the ground or reject a waypoint on the ground based on the information on the display means. A reason for rejecting a waypoint on the ground may be that the distance does not match with the intended size of an athletic/sports field.

In one or more embodiments, the sports field marking equipment is configured to calculate the distance between stored waypoints and provide display signals for displaying the distance between stored waypoints.

In one or more embodiments, the sports field marking equipment is configured to calculate a distance between stored waypoints and provide display signals for displaying a distance between stored waypoints; and wherein the display means of the hand-held operator control unit is configured to display a distance between stored waypoints.

In one or more embodiments, the hand-held operator control unit is configured to provide signals to the sports field marking equipment to delete one or more of said displayed stored waypoints.

It may be a challenge to precisely navigate the mobile robot in proximity to a target location with a hand-held operator control unit. This process may be alleviated by introducing a slow mode, which allows the user to drive the mobile robot at a lower speed than normally. This configuration lowers the time for collecting the waypoints. The slow mode may be activated and deactivated by the hand-held operator control unit. In one or more embodiments, wherein after selecting a control function accepting manual positioning of a mobile robot, the mobile robot is configured to move at 30-90% speed compared to normal operation mode, such as within the range of 35-85%, e.g. within the range of 40-80%, such as within the range of 45-80%, e.g. within the range of 50-75%, such as within the range of 55-70%, e.g. within the range of 60-65% speed compared to normal operation mode.

If the highest possible precision is needed, the mobile robot shall read the position of the point and compensate for the tilting of the mobile robot due to the slope of the ground. Compensation of the tilt is possible with a clinometer (tilt angle measurement device) in the mobile robot. Based on the reading of the clinometer the correct position of the selected point is calculated by the mobile robot.

In one or more embodiments, the position determining device comprises a positioning system receiver unit configured for receiving a positioning signal.

In one or more embodiments, the position determining device comprises a pointing element/device adapted for pointing to a post or location to be measured. The pointing element is preferably suspended in a suspension device adapted for vertically positioning the pointing element/device.

In one or more embodiments, the position determining device comprises:
a positioning system receiver unit configured for receiving a positioning signal; and
a pointing element adapted for pointing to a location to be measured.

In one or more embodiments, the position determining device comprises a pointing device adapted for pointing to a post or location to be measured, and wherein the pointing device is suspended in a suspension device adapted for vertical positioning of the pointing element/device.

In one or more embodiments, the pointing device comprises a tilt angle measurement device.

The tilt angle measurement device can comprise an electronic tilt measurement device. The electronic tilt measurement device can comprise a single angle measurement device or a dual angle measurement device.

In one or more embodiments, the distance of the phase center of the positioning system receiver unit from the pointing element is known.

The sports field marking equipment may in one or more embodiments comprise a positioning system configured for receiving a GNSS signal. Global Navigation Satellite Systems (GNSS) is a collective term for a variety of satellite navigation systems, which use orbiting satellites as navigation reference points to determine position fixes on the ground. GNSS includes the Global Positioning System (GPS), the Global Navigation Satellite System (GLONASS), the Compass system, Galileo, and a number of Satellite based augmentation systems (SBAS).

In typical civilian applications, a single GNSS receiver can measure a ground position with a precision of about ten meters. This is, in part, due to various error contributions, which often reduce the precision of determining a position fix. For example, as the GNSS signals pass through the ionosphere and troposphere, propagation delays may occur. Other factors, which may reduce the precision of determining a position fix, may include satellite clock errors, GNSS receiver clock errors, and satellite position errors. One method for improving the precision for determining a position fix is Real-Time Kinematic (RTK) GNSS. Real Time Kinematic (RTK) satellite navigation is a technique using the phase of the signal's carrier wave, rather than the information content of the signal, and relies on a single reference station or interpolated virtual station to provide real-time corrections.

In one or more embodiments, the sports field marking equipment comprises a retroreflector, and wherein the positioning system receiver unit configured for receiving a positioning (e.g. GNSS) signal receives the position signal from a total station.

In one or more embodiments, the sports field marking equipment comprises a Real Time Kinematic (RTK) GNSS positioning system.

In one or more embodiments, the retroreflector and/or the RTK GNSS positioning system are positioned on an elongate member extending upward from a base of the sports field marking equipment. This is an advantage to make the retroreflector more visible for the emitter/receiver unit in the total station. Furthermore, the RTK GNSS positioning system will be more visible for the satellites.

In one or more embodiments, the elongate member is height adjustable, e.g. comprising telescoping elongate members.

In one or more embodiments, the RTK positioning system is positioned above the retroreflector. This is to avoid shielding by the retroreflector.

In one or more embodiments, the measuring element is a sonic-based measuring device or a laser-based measuring device.

A second aspect relates to the use of a sports field marking equipment for identifying and automatically generating waypoints for fixed goal and/or corner posts of a given sports field; wherein the sports field marking equipment is according to the present invention.

In one or more embodiments, the use further comprises marking a specific type of sports field based on the generated waypoint(s) of goal and/or corner posts.

A third aspect relates to a method for interactively providing waypoints to a sports field marking equipment for use in the marking of a sports field comprising the steps of:
i) Providing a sports field marking equipment according to the present invention;
ii) Positioning the sports field marking equipment in proximity to a first fixed goal and/or corner post of a given sports field;
iii) Instructing the sports field marking equipment to store the first fixed goal and/or corner post as a first waypoint;
iv) Repeating steps ii)-iii) at the remaining fixed goal and/or corner post of said sports field to obtain their respective waypoints.

A fourth aspect relates to a method for interactively providing waypoints to a sports field marking equipment for use in the marking of a sports field comprising the steps of:
i) Providing a sports field marking equipment according to the present invention;
ii) Positioning the sports field marking equipment at a given sports field;
iii) Instructing the sports field marking equipment to search for a fixed goal and/or corner post positioned on said sports field, and when identified to store said first fixed goal and/or corner post as a first waypoint;
iv) Repeating step iii) at the remaining fixed goal and/or corner post of said sports field to obtain their respective waypoints.

As used in the specification and the appended claims, the singular forms "a", "an", and "the" include plural referents unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

It should be noted that embodiments and features described in the context of one of the aspects of the present invention also apply to the other aspects of the invention.

REFERENCES

1 Sports field marking equipment
2 Core position
3 Sensor
4 Sensor field
5 Wall

The invention claimed is:

1. A sports field marking equipment, wherein the sports field marking equipment is a mobile robot, the mobile robot comprising:
   a paint applying means adapted for use in marking a sports field on a surface; and
   a position determining device configured for determining the position of the mobile robot;
characterized in that the mobile robot further comprises:
   a distance sensor configured for detecting a goal and/or corner post and the distance thereto;
   a first processor;
   a first memory coupled to the first processor, wherein the first memory comprises program instructions executable by the first processor for:
      receiving a goal and/or corner post detection signal as well as the measured distance from the distance sensor to the goal and/or corner post;
      receiving the position and direction of the mobile robot from the position determining device at the time of receiving the detection signal;
      computing waypoint coordinates of the goal and/or corner post based on the received data; and
      storing the computed waypoint coordinates of the goal and/or corner post.

2. The sports field marking equipment according to claim 1, wherein the distance sensor is a one-dimensional sensor.

3. The sports field marking equipment according to claim 1, wherein the distance sensor is a one-dimensional sensor, and wherein the memory comprises program instructions implementing a graphical user interface for:
   a) interactively selecting a target location for initiating a goal and/or corner post detection operation; and
   b) interactively selecting a specific type of goal or corner post from a list of goal and/or corner posts;
wherein the first memory comprises program instructions executable by the processor for:
   computing waypoint coordinates of the goal and/or corner post based on the selection and received data.

4. The sports field marking equipment according to claim 1, wherein the distance sensor is a one-dimensional sensor, wherein the mobile robot further comprises a laser pointer adapted for pointing on a goal and/or corner post, and wherein the laser pointer is configured to point in the same direction as the distance sensor.

5. The sports field marking equipment according to claim 1, wherein the distance sensor is a two-dimensional sensor.

6. The sports field marking equipment according to claim 1, wherein the distance sensor is a two-dimensional sensor, and wherein the memory comprises program instructions implementing a graphical user interface for interactively selecting a specific type of goal or corner post from a list of goal and/or corner posts;
wherein the first memory comprises program instructions executable by the processor for:
computing waypoint coordinates of the goal and/or corner post based on the selection and received data.

7. The sports field marking equipment according to claim 1,
wherein the memory comprises program instructions implementing a graphical user interface for:
interactively selecting a specific type of sports field from a list of sports fields;
wherein the first memory comprises program instructions executable by the processor for:
marking the selected type of sports field based on the computed waypoint(s) of goal and/or corner posts.

8. The sports field marking equipment according to claim 1, wherein the memory comprises program instructions implementing a graphical user interface for:
interactively selecting a specific type of sports field from a list of sports fields;
wherein the first memory comprises program instructions executable by the processor for:
marking the selected type of sports field based on the computed waypoint(s) of goal and/or corner posts; and
wherein when the waypoint coordinate of a first goal and/or corner post has been computed and stored, the first memory comprises program instructions executable by the processor for:
automatically moving the mobile robot towards and searching for a second or further goal and/or corner post based on a) a selected specific type of sports field, b) the position of the mobile robot, c) a selected specific type of goal and/or corner post and/or d) the first computed waypoint coordinate of the first goal and/or corner post.

9. The sports field marking equipment according to claim 1, wherein the memory comprises program instructions implementing a graphical user interface for:
interactively selecting a specific type of sports field from a list of sports fields;
wherein the first memory comprises program instructions executable by the processor for:
marking the selected type of sports field based on the computed waypoint(s) of goal and/or corner posts; and
wherein when the waypoint coordinate of a first goal and/or corner post has been computed and stored, the first memory comprises program instructions executable by the processor for:
automatically moving the mobile robot towards and searching for a second or further goal and/or corner post based on a) a selected specific type of sports field, b) the position of the mobile robot, c) a selected specific type of goal and/or corner post and/or d) the first computed waypoint coordinate of the first goal and/or corner post; and
wherein the first memory comprises program instructions executable by the processor for:
automatically moving the mobile robot towards and searching for the goal and/or corner post nearest to the last identified goal and/or corner post.

10. The sports field marking equipment according to claim 1, wherein during the operation of detecting a goal and/or corner post, the mobile robot is configured to move at 30-90% speed compared to normal operation mode.

* * * * *